United States Patent [19]

Erickson et al.

[11] Patent Number: 5,729,025

[45] Date of Patent: Mar. 17, 1998

[54] ELECTROMECHANICALLY ACTUATED TURBIDITY SENSOR FOR A MACHINE FOR WASHING ARTICLES

[75] Inventors: Timothy K. Erickson, Lena; Brady J. Hammond; Gary R. O'Brien, both of Freeport; Ian F. Reeve, Rockford, all of Ill.

[73] Assignee: Honeywell Inc., Minneapolis, Minn.

[21] Appl. No.: 677,260

[22] Filed: Jul. 9, 1996

[51] Int. Cl.$^6$ ............... G01N 21/47; D06F 33/02; A47L 15/46
[52] U.S. Cl. ............... 250/574; 356/339; 68/12.02; 68/12.27
[58] Field of Search ............... 250/574; 8/158; 134/113; 356/338, 339, 442; 68/12.02, 12.05, 12.27

[56] References Cited

U.S. PATENT DOCUMENTS

| | | |
|---|---|---|
| 5,291,626 | 3/1994 | Holnan et al. . |
| 5,331,177 | 7/1994 | Kubioiak et al. . |
| 5,444,531 | 8/1995 | Foreman et al. . |
| 5,446,531 | 8/1995 | Boyer et al. . |
| 5,453,832 | 9/1995 | Joyce ............... 250/574 |
| 5,485,013 | 1/1996 | Cummins . |
| 5,560,060 | 10/1996 | Dausch et al. ............... 68/12.02 |

*Primary Examiner*—Edward P. Westin
*Assistant Examiner*—Kevin Pyo
*Attorney, Agent, or Firm*—William D. Lanyi

[57] ABSTRACT

A machine for washing articles is provided with a turbidity sensor that is activated by an electromechanical timer. When activated, the turbidity sensor determines the magnitude of turbidity of water within the machine for washing articles and decides whether or not to inhibit a subsequent drain operation. If the turbidity of the water is sufficiently low, the drain operation is inhibited and the machine for washing articles is prevented from purging the existing water from its interior. This allows the relatively clean water to be reused at a savings of both water and energy.

20 Claims, 5 Drawing Sheets

| Cumulative Time (Mins) | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| Event | DR | | FILL | | | WASH | | | | | | | | DR | | FILL | | | WASH | | | | | | | | DR | | FILL | | | RINSE |
| Water Usage | | | 8 QT | | | | | | | | | | | | | 8 QT | | | | | | | | | | | | | 8 QT | | | |
| Selectable Start Time | A | | | | | | | | | | | | | A | | | | | | | | | | | | | A | | | | | |
| Sensor "ON" Times | | | | | | | | | | | | | | | | | | | | | | | | | | | | | | | | |

| 36 | 37 | 38 | 39 | 40 | 41 | 42 | 43 | 44 | 45 | 46 |
|---|---|---|---|---|---|---|---|---|---|---|
| DR | | FILL | | | MAIN WASH | | | | | |
| | | 8 QT | | | | | | | | |
| | | | | | | | | | | |
| | | | | | | | | | | |

| 61 | 62 | 63 | 64 | 65 | 66 | 67 | 68 | 69 | 70 | 71 | 72 | 73 | 74 | 75 | 76 | 77 | 78 | 79 | 80 | 81 | 82 | 83 | 84 |
|---|---|---|---|---|---|---|---|---|---|---|---|---|---|---|---|---|---|---|---|---|---|---|---|
| DR | | FILL | | | RINSE | | | | | | | DR | | FILL | | | RINSE | | | | | DR | |
| | | 8 QT | | | | | | | | | | | | 8 QT | | | | | | | | | |

Fig. 8

ELECTROMECHANICALLY ACTUATED TURBIDITY SENSOR FOR A MACHINE FOR WASHING ARTICLES

BACKGROUND OF THE INVENTION

1. Field of the Invention

The present invention is generally related to turbidity sensors and, more particularly, to a turbidity sensing system that combines an electromechanical timer with a turbidity sensor to selectively inhibit the machine for washing articles from draining water therefrom under certain conditions determined as a function of the turbidity of the water within the machine for washing articles.

2. Description of the Prior Art

Many different types of turbidity sensors are well known to those skilled in the art. Turbidity sensors have been used in dishwashers and clothes washers to measure the magnitude of turbidity of the water used within the machines. Certain turbidity sensors use transmitted light and determine the turbidity of water as a function of the light transmitted from a light source to a photosensitive component across a preselected distance. Particulate matter suspended in the water blocks some of the light from being received by the photosensitive component and the amount of light received can therefore be used as an indication of the turbidity of the water. Other turbidity sensors use both transmitted and reflected light to determine the turbidity of the water. The transmitted and reflected light can be analyzed independently or compared to each other to determine the magnitude of turbidity of the water.

U.S. Pat. No. 5,485,013, which issued to Cummins on Jan. 16, 1996, discloses a turbidity sensor with a light aperture arrangement of two openings formed in parallel plates. The turbidity sensor is provided with two plates which each have an aperture formed therethrough. The apertures are aligned to define a light passage from a light source such as a light emitting diode. By properly selecting the gap between the two plates and the size of the two apertures, the angle of the diverging light emanating from the light source can be controlled and reduced to a magnitude that prevents light from passing directly from the light source to a scattered light detector of the turbidity sensor. The arrangement avoids the necessity of using expensive focusing lenses.

U.S. Pat. No. 5,446,531, which issued to Boyer et al on Aug. 29, 1995, describes a sensor platform for use in machines for washing articles. A plurality of fluid condition sensors are combined together to provide a sensor cluster that senses turbidity, temperature, conductivity and the movement of a ferromagnetic object. The plurality of sensors are attached to a substrate and encapsulated, by an overmolding process, with a light transmissive and fluid impermeable material. The sensor cluster can be disposed at numerous different locations within a body of fluid and does not require a conduit to direct the fluid to a particular location proximate the sensor. In a preferred embodiment of the invention, a circuit is provided which monitors the signal strength of first and second light sensitive components in order to determine the turbidity and, in addition, those signal strengths are also used to advantageously determine the most efficient magnitude of current necessary to drive a light source, such as a light emitting diode. By controlling the current to a light emitting diode as a function of the strength of light signal received by first and second light sensitive components, the turbidity sensor can be operated at a more efficient and effective level.

U.S. Pat. No. 5,444,531, which issued to Foreman et al on Aug. 22, 1995, discloses a device very similar to the device described above in U.S. Pat. No. 5,446,531, but focuses more particularly on the control of the current flowing through the light emitting diode.

U.S. Pat. No. 5,331,177, which issued to Kubisiak et al on Jul. 19, 1994, describes a turbidity sensor with an analog-to-digital conversion capability. The turbidity sensor is provided with a light source and a plurality of light sensitive components which are disposed proximate a conduit to measure the light intensity directed across the conduit from the light source and at an angle therefrom. The conduit is provided with a plurality of protrusions extending radially inward from the walls of the conduit to discourage the passage of air bubbles through the light beam of the sensor. The direct light beam and the scattered light beam are compared to form a relationship that is indicative of the turbidity of the light passing through the conduit. The rate of change of turbidity is provided as a monitored variable.

U.S. Pat. No. 5,291,626, which issued to Molnar et al on Mar. 8, 1994, describes a machine for cleansing articles, such as a dishwasher, which incorporate a device for measuring the turbidity of an at least partially transparent fluid. The device includes sensor for detecting scattered electromagnetic radiation and a sensor for detecting transmitted electromagnetic radiation.

The incorporation of a turbidity sensor in a machine for washing articles, such as a dishwasher or a clothes washer, can increase the cost of the machine by a significant amount because of the complexity of known turbidity sensors. Typically, a turbidity sensor can comprise a microprocessor which controls the operation of the turbidity sensor and analyzes the signals received thereby to determine the magnitude of turbidity of the water within the machine for washing articles. It would be beneficial if the operation of a turbidity sensor could be significantly simplified and, as a result, the costs of the turbidity sensor significantly reduced.

One beneficial use to which a turbidity sensor can be applied is the conservation of water during the operation of a machine for washing articles. The repeated draining and refilling of a machine for washing articles uses a significant amount of water and, if it is not excessively dirty, the draining of the water can represent a significant waste of water. The appropriate use of a turbidity sensor can avoid the unnecessary draining and refilling of machines for washing articles.

If the operation and construction of a turbidity sensor can be simplified, a significant savings in water usage can be accomplished without adding significantly to the costs of the machine for washing articles.

SUMMARY OF THE INVENTION

The present invention provides a machine for washing articles that comprises a turbidity sensor for determining a magnitude of turbidity of water within the machine. It also comprises a means for removing water from the machine. The turbidity sensor is connected in association with the removing means in order to permit the turbidity sensor to inhibit the removing means from removing water from the machine. This inhibiting function is exercised by the turbidity sensor when it determines that the magnitude of turbidity of the water is within a preselected range. The present invention further comprises an electromechanical timer that controls a plurality of switches. The plurality of switches are controllable by the timer in a preselected chronological sequence. One of the switches is connected in association with the turbidity sensor to activate the turbidity sensor at one or more predetermined intervals during a wash cycle of the machine for washing articles.

As a result of the combination of elements of the present invention, the timer can actuate the turbidity sensor at one or more preselected intervals during the operation of the machine and, when activated, the turbidity sensor can determine the magnitude of the turbidity of the water within the machine and then can inhibit the operation of the removing means as a function of the magnitude of turbidity.

The removing means described immediately above can comprise a simple drain control valve. Alternatively, it can comprise an electric motor that is associated with a drain in order to pump the water out of the machine for washing articles. The turbidity sensor can be connected to the main winding of the electric motor in order to prevent power from being connected to the main winding when the magnitude of turbidity is within the preselected range of values.

Although many physical locations within the machine can be chosen for the disposition of the turbidity sensor, a preferred embodiment places the turbidity sensor within a pump housing of the machine. As described above, the machine for washing articles can be a dish washing machine or a clothes washing machine. The turbidity sensor can comprise a light sensitive component positioned to measure light that is emitted by a light source and scattered by particulate matter suspended within the water. The light sensitive component can be disposed to receive light in a direction which is at an angle from the direction in which the light is emitted by the light source. The angle can be a right angle or any other appropriate angle. The light source can be a light emitting diode and the light sensitive component can be a photoresistor.

BRIEF DESCRIPTION OF THE DRAWINGS

The present invention will be more fully and completely understood from a reading of the Description of the Preferred Embodiment in conjunction with the drawings, in which:

FIG. 8 is a timing chart showing the operation of a machine for washing articles.

DESCRIPTION OF THE PREFERRED EMBODIMENT

Figure 1:
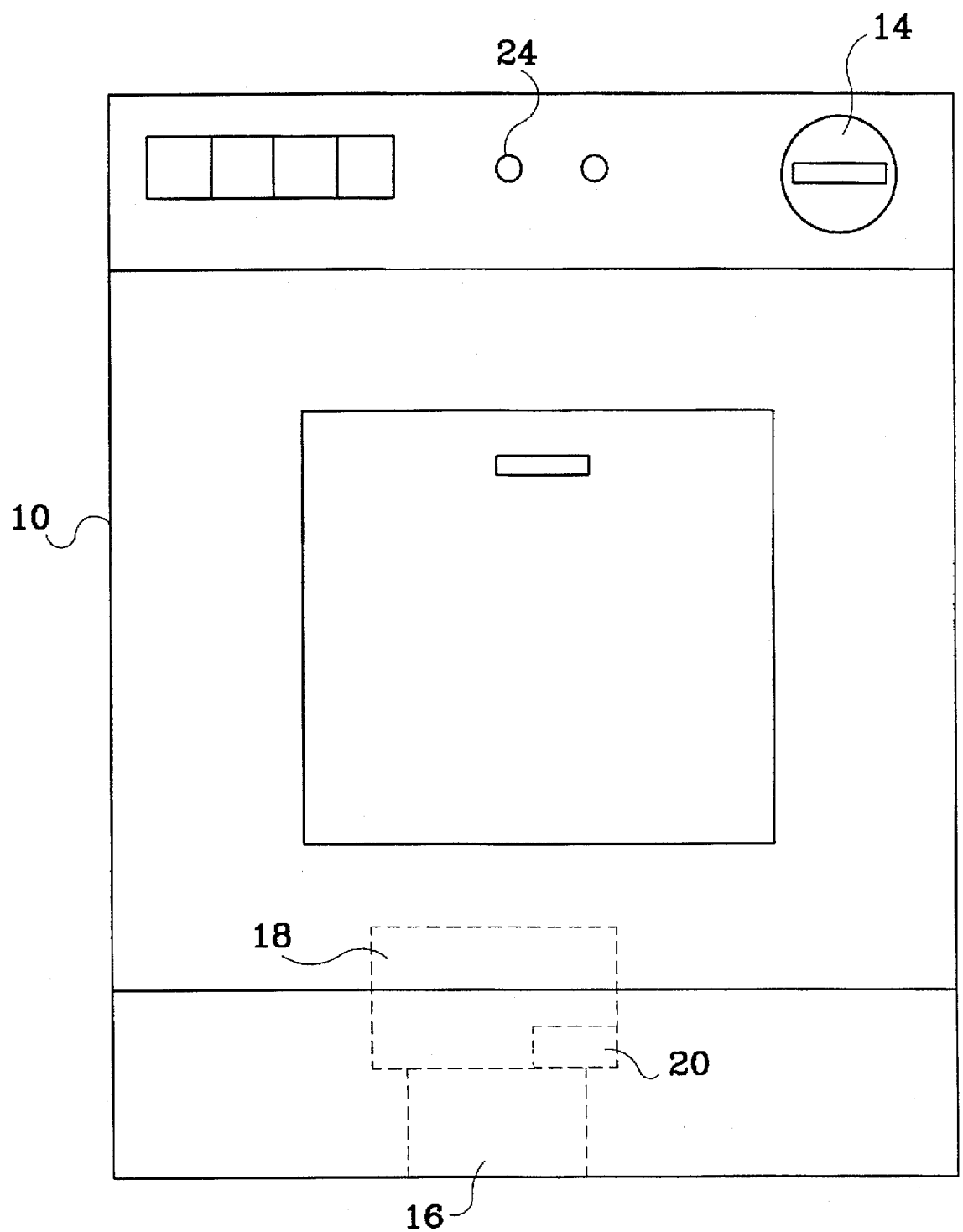
FIG. 1 is an exemplary illustration of a machine for washing articles.

Throughout the Description of the Preferred Embodiment, like components will be identified by like reference numerals.

The primary goal of the present invention is to provide an effective, but inexpensive, means for controlling the operation of a machine for washing articles as a function of the turbidity of the water flowing within the machine. In order to reduce the costs of a machine that includes a turbidity sensor made in accordance with the present invention, minimum alteration of the machine is made while incorporating the advantageous improvements to the machine by adding a turbidity sensor and controlling portions of its operation by the turbidity sensor.

The present invention will be described in terms of its specific application in a dishwasher. Most dishwashers operate by performing a number of individual procedures in a predefined order. These procedures comprise a drain operation, a fill operation and a wash operation. The wash operation may or may not include soap in the water. It involves the agitation of water and the direction of streams of the water against dishes placed within the machine. A pump is run in a first direction in order to cause the water within the machine to be propelled against the dishes for the purpose of dislodging soil. The drain operation consists of opening a drain valve and, in some cases, pumping the water out of the machine and into the drain. The pump used to propel the water against the dishes during the wash operation can be reversed to pump the water out of the machine during the drain procedure. A motor associated with the pump is usually run in a first direction during the wash cycle and an opposite direction during the drain cycle. The fill operation consists of opening a water supply valve and allowing the water to fill the internal volume of the machine for washing articles to a preselected water level. These three procedures are typically run in sequence and the sequence can be repeated a number of times. An operator is usually given the option to select the beginning of the wash cycle at any one of several starting points. The selection of the starting point will determine the number of drain, fill and wash operations performed by the machine. The minimal operation of a machine for washing articles will consist of a drain operation, followed by a fill operation and then followed by a wash operation. Finally, the water would be emptied from the machine by a final drain operation. To perform a more robust washing procedure, two cycles would be performed, wherein each cycle consists of a drain operation, a fill operation and a wash operation. After the two cycles are completed, a final drain operation is performed to empty the water from the machine.

Dishwashers are typically provided with a means by which soap can be automatically added to the water within the machine at a preselected time following the beginning of the washing cycle.

Each time the machine for washing articles is drained and refilled with clean water, a significant amount of water is used. A typical dishwasher uses eight quarts of water each time it is refilled following a drain operation. If the drain operation and fill operation are performed six times during the total dishwashing procedure, for example, 48 quarts of water will be used. It should be understood that most dishwashers allow the selection of various washing procedures, ranging from a light washing cycle to a heavy washing cycle. Between these two extremes, most dishwashers allow the selection of a normal washing cycle.

For the purpose of describing a preferred embodiment of the present invention, it will be discussed in terms of its inclusion within a dishwasher. FIG. 1 shows a typical dishwasher 10. A hand selectable timer 14 allows the operator to turn the dial of the timer to select a beginning point for the washing procedure and, as a result, select the overall length of the total washing procedure. In effect, the operator selects the beginning point of the cycle, at one of several optional starting points, and the end of the cycle is automatically controlled by the timer. Therefore, the selection of the starting point of the cycle will determine the overall length of the cycle and the number of drain and fill operations that will occur during this cycle. Within the structure of the dishwasher 10, a motor 16 causes a blade within a pump 18 to rotate. Although not specifically illustrated in FIG. 1, the motor 16 also causes one or more wash arms to rotate and direct a spray of water, propelled by the pump 18, against the dishes that are placed on racks within the opening of the dishwasher 10. The general operation of a dishwasher is well known to those skilled in the art and will not be described in detail herein. U.S. Pat. No. 5,291,626, discussed above, describes the internal structure of the dishwasher and its operation in detail.

With continued reference to FIG. 1, a turbidity sensor 20 can be disposed within the pump housing to monitor a magnitude of turbidity of the water passing through the pump housing. Alternatively, the turbidity sensor can be disposed within a conduit through which water passes during the operation of the dishwasher 10. Regardless of the location of the turbidity sensor, it's function is to determine a magnitude of turbidity of the water within the dishwasher. As is well known to those skilled in the art, a turbidity sensor operates according to the principle that particulate matter suspended in water will affect the passage of light through the water. If light is transmitted along a line from a light source to a first photodetector, increased particular matter will decrease the light received by the photodetector. Alternatively, if the photodetector is placed at an angle from the light path emitted by the light source, it can receive light scattered by the particulate matter suspended in the water. In a typical operation, increased particulate matter will increase the amount of scattered light received by a photodetector disposed at an offset location from the light beam emitted by the light source and the light received by the photodetector in line with the light beam will decrease. Skilled artisans in the field of turbidity sensing understand that the relationship is not a simple one and the comparison of scattered and transmitted light passing through a detection zone of particulate matter can be carefully analyzed and compared to each other in order to determine the type and quantity of particulates suspended in the water. These techniques are well known to those skilled in the art and will not be described in greater detail herein.

One problem with many dishwashers known to those skilled in the art is that the selection of the wash cycle, by the selection of the position of timer dial 14, can inadvertently waste a significant amount water by selecting a wash cycle that is much more lengthy and vigorous than required. As an example, if the dishes within the dishwasher 10 are clean, but a "HEAVY SOIL" or "POTS and PANS" cycle is selected, the dishwasher will proceed through as many as six drain, fill and wash operations, each using fresh water. As much as 40 quarts of water can possibly be wasted by this type of operator error. It would therefore be beneficial if, through a minor and inexpensive alteration of the dishwasher 10 in FIG. 1, this waste of water can be prevented regardless of the selection by the operator when timer 14 is set at the beginning of the dishwashing cycle.

With continued reference to FIG. 1, a light indicator 24 can be energized to inform the operator that the machine is performing a water conservation action that might not have been anticipated by the operator. Although not a necessary component of the present invention, the light signal 24 can be helpful in informing the operator when the present invention is taking action to conserve water.

The basic operation of the present invention is to use the timer 14 to energize a turbidity sensor 20 at one or more preselected intervals of time during the overall dishwashing procedure. When activated, the turbidity sensor 20 measures a magnitude of turbidity of the water and, as a function of the magnitude of turbidity, determines whether or not the operation of the motor 16 should be inhibited to prevent the motor 16 from draining the water from the dishwasher 10. Depending on the type of device and methodology used to drain the water from the machine, this action by the turbidity sensor 20 can vary. For example, if a simple drain valve is used to allow the water to flow out of the dishwasher 10, the inhibiting procedure exercised by the turbidity sensor 20 would be the maintaining of the drain valve in a closed position. More likely, however, the draining procedure incorporates the operation of the motor 16 in a reverse direction to cause the pump 18 to rotate backwards and force the water to drain out of the machine under the influence of the pump. In some machines, a separate motor can be used for the drain operation. If the drain operation can be eliminated, whenever the magnitude of turbidity is relatively low, significant water savings can be achieved. The primary purpose of the present invention is to allow the turbidity sensing system to eliminate certain drain operations whenever the water is relatively clean instead of draining the clean water, refilling the dishwashing machine with more clean water and possibly reheating the water. In order to perform this valuable function without unduly increasing the costs of the machine for washing articles, the present invention incorporates a relatively simple electromechanical timer, which is used on many dishwashing machines at the present time, and activates the turbidity sensor by the timer at preselected intervals. When activated, the turbidity sensor determines the magnitude of turbidity of the water and, if the turbidity is lower than a preselected level, the turbidity sensor inhibits draining the operation of the motor. All other functions are run normally and the timer is allowed to run through its entire cycle of operations. The only difference in the operation of the machine for washing articles when the present invention is incorporated therein is that one or more of the drain cycles can be eliminated. In some machines, if the drain operation is eliminated, the fill operation is naturally eliminated or significantly reduced because the existing water is never drained from the machine. The following wash cycle will operate normally, but with the existing water that remained in the dishwasher from the previous wash cycle. Other machines may require additional means to inhibit the fill operation.

Figure 2:
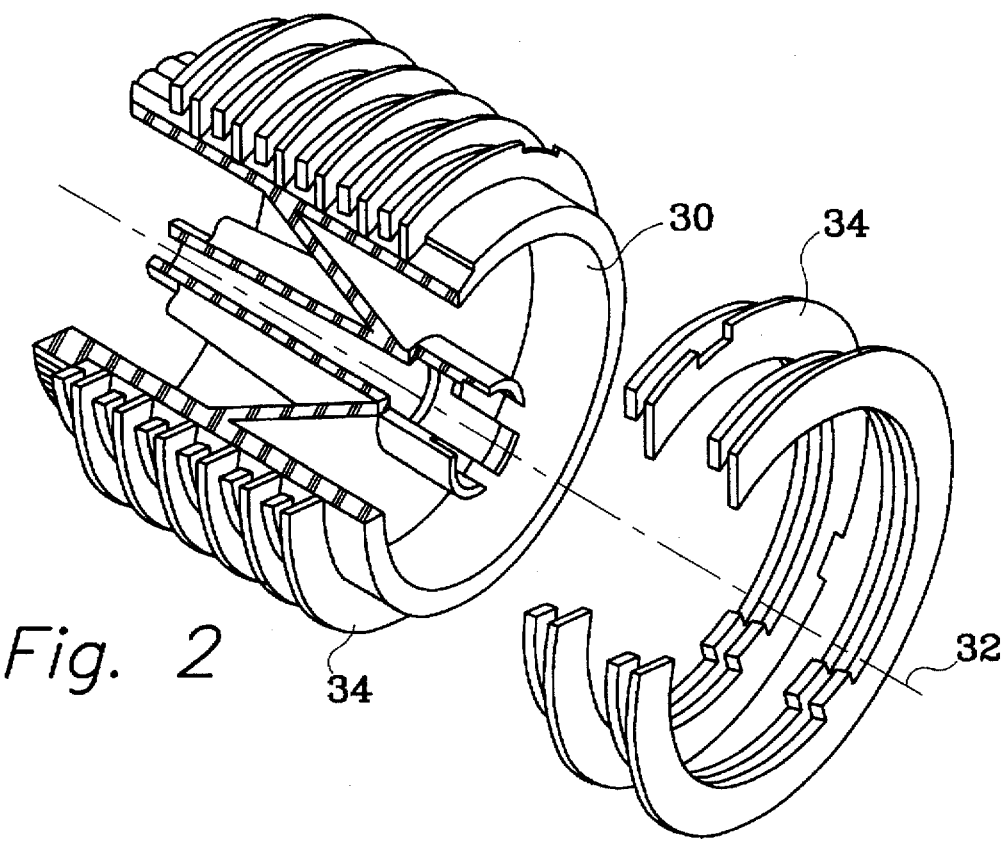
FIG. 2 is a logic module of an electromechanical timer showing the rotatable drum and a plurality of cams inserted onto the outer periphery of the drum.

FIG. 2 shows a typical mechanical logic module used in electromechanical timers. Programmed timers are commercially available from the Mallory Corporation and have been used to control the operation of many different types of machines, such as dishwashers. The basic operation of a timer of this type causes a logic module 30 to rotate about a centerline 32. As the logic module 30 rotates, the cam surfaces of a plurality of cam inserts 34 rotate with the module. A plurality of switch actuators, not shown in FIG. 2, rest on the cam surfaces of the cams 34 which are determined by the outer cylindrical surfaces of each cam. The raised and lower portions of the cam surfaces cause associated switch actuators to move and either actuate or deactuate the associated switch. The cams 34 can be configured to control water valves, heater, blowers, motor main windings, dispensers, motor wash windings and motor drain windings. Obviously, many other components can be controlled if appropriate switches are associated with the cams 34 to control their operation. As the logic module 30 rotates about centerline 32, in response to a clock mechanism, the individual modes of the cams 34 actuate their associated switch actuators and control the total sequence of procedures performed by the machine for washing articles. By positioning the starting point of the timer 14 in FIG. 1, the precise operations controlled by the cam surfaces and associated switches is selected. In a preferred embodiment of the present invention, an additional cam 34 is attached to the logic module 30 in order to activate the turbidity sensor of the present invention at preselected intervals during the washing procedure.

Figure 3:
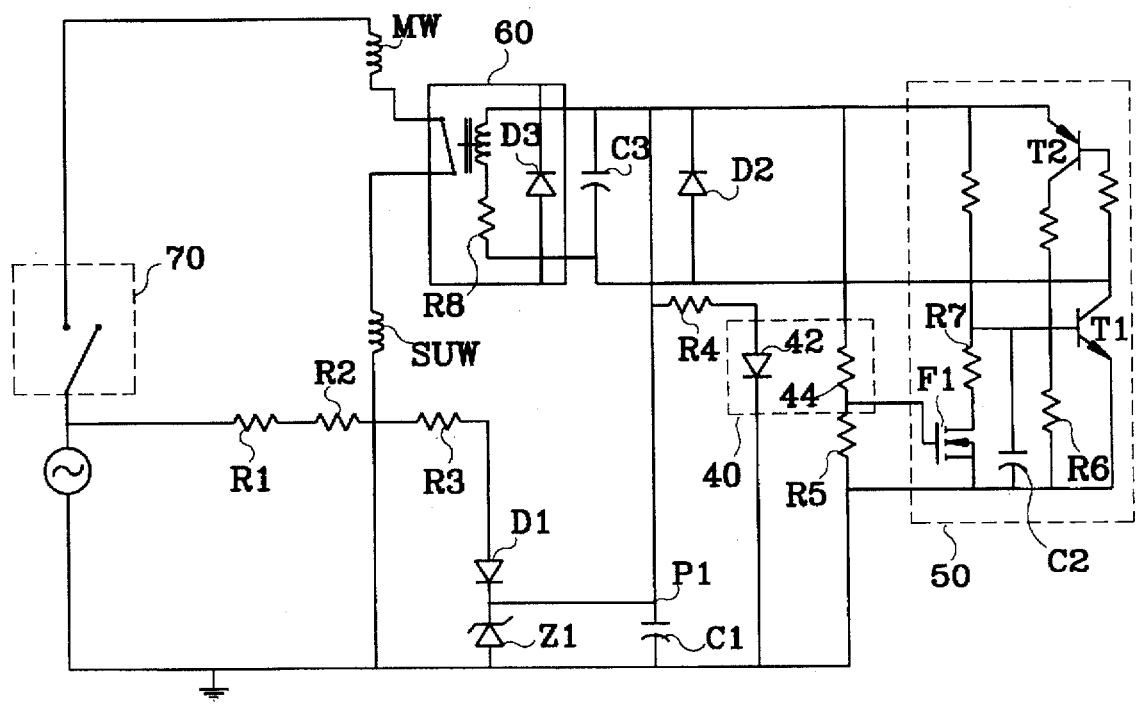
FIG. 3 is an electrical schematic of a circuit made in accordance with the present invention.

In order to perform the functions of the present invention, some means is necessary to allow the turbidity sensor to inhibit the operation of the drain cycle. When the drain cycle is controlled by an electric motor 16, the circuit in FIG. 3 is suitable to perform this function. A turbidity sensor 40 comprises a light emitting diode 42 and a photoresistor 44. In a preferred embodiment of the present invention, as will be described in greater detail below, the light emitting diode 42 is positioned to direct a beam of light into a detection zone and the photoresistor is positioned to detect light scattered by particulate matter within the detection zone at an angle of approximately 90 degrees. In order to provide power to the turbidity sensor 40, three resistors, R1, R2 and R3 are used in cooperation with Zener diode Z1 and diode D1, to provide a 15 volt supply at the circuit point identified as P1. Capacitor C1 cooperates with the Zener diode Z1 and diode D1 to provide a DC voltage through resistor R4 to the light emitting diode 42 and other components. Resistor R5 is an adjustment potentiometer used to calibrate the operation of the turbidity sensor by determining a precise trip point below which the turbidity sensor 40 will inhibit the operation of the drain motor and above which the turbidity sensor will allow the operation of the drain motor. Within the delay and latching circuit 50, resistors RA and R6 and capacitor C2 cooperate to avoid inappropriate operation during startup. The delay in operation provided by these components avoids the possibility of photoresistor 44 immediately determining very low turbidity because the light from light emitting diode 42 has not yet begun to operate at full intensity. Without the delay, the voltage at field effect transistor F1 would be insufficient to cause it to conduct and allow the normal operation of the drain winding of the electric motor 16 when the water is sufficiently soiled to require a drain operation and a fill operation.

With continued reference to FIG. 3, the normal operation of the circuit would provide power to the turbidity sensor 40 and, if the resistance of photoresistor 44 is sufficiently low because of the intensity of light reflected by the particulate matter toward it, the gate of field effect F1 would be sufficiently high to cause the field effect transistor F1 to conduct. Conduction through field effect transistor F1 will cause the voltage at the base of transistor T1 to decrease and prevent conduction through transistor T1. This, in turn, will raise the voltage at the base of transistor T2 and not operate a relay 60 that opens a winding of the motor 16 and inhibits the draining operation. In FIG. 3, the main winding MW and the start up winding SUW of the motor 16 are shown. A switch of the timer is indicated at the left of FIG. 3 and identified by reference numeral 70. It should be understood that the switch 70 is one of the group of switches arranged in alignment with the cams 34 on the logic module 30 shown in FIG. 2. When the switch 70 is closed, power is provided to the circuit shown in FIG. 3 and, as a result of the resistors, R1, R2 and R3, power is also provided to the turbidity sensor 40.

The turbidity sensor 40 senses the magnitude of turbidity in the water within the machine for washing articles by reacting to the resistance of the photoresistor 44. If the resistance remains high, because light is not scattered toward it by particulate matter in the water, the gate voltage of field effect transistor F1 remains low and the circuit in FIG. 3 latches the main winding of motor 16 in an off condition to avoid the draining operation.

Figure 4:
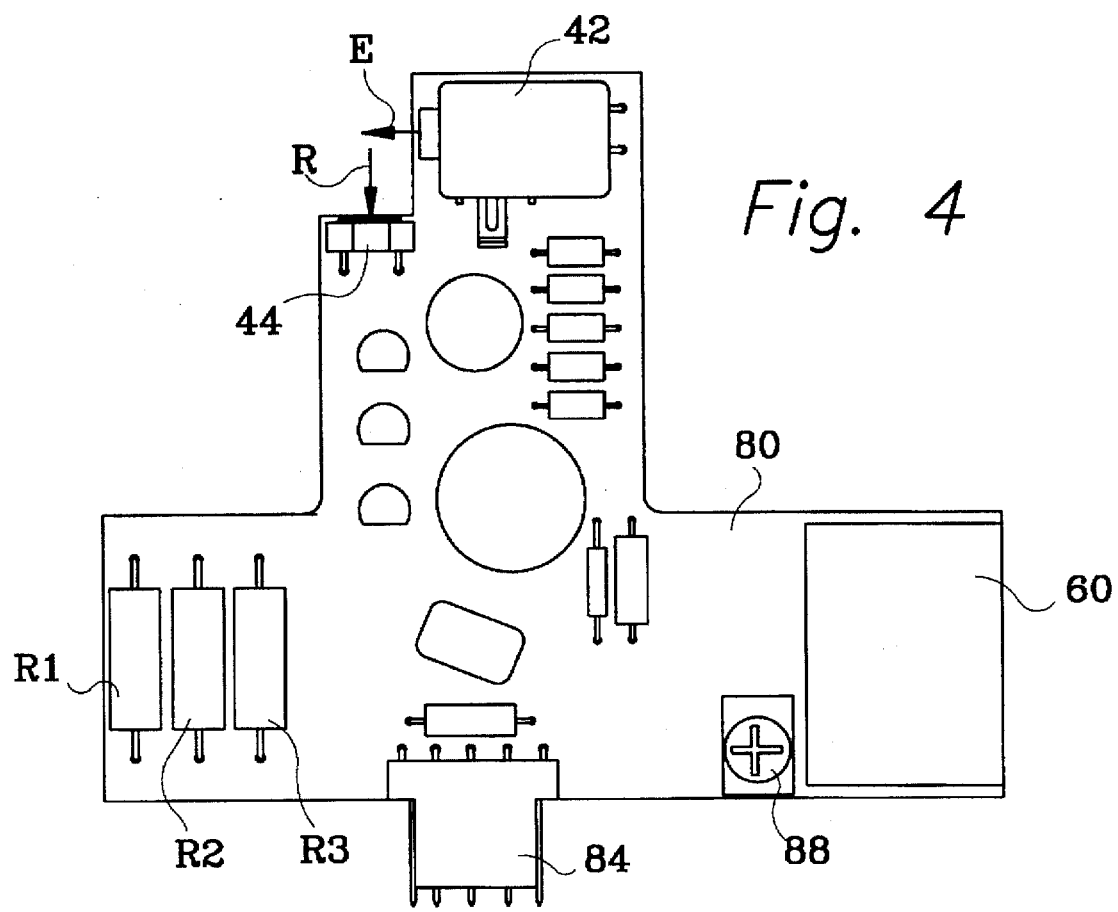
FIG. 4 shows a circuit board used to contain the individual components of the turbidity sensor of the present invention.

FIG. 4 shows a circuit board made in accordance with the present invention. With reference to FIGS. 3 and 4, the light emitting diode 42 and its associated housing and aperture components are attached to the circuit board 80 to direct a light beam E of emitted light toward a detection zone. The photoresistor 44 is attached to the circuit board 80 to receive reflected light R which is scattered by particulate matter within the detection zone. Certain other components are identified by the reference of numerals and letters used to described them above in conjunction with FIG. 3. The circuit board 80 is provided with a connection 84. Also attached to the circuit board 80 is an adjustable potentiometer 88 that controls the resistance of resistor R5.

Figure 5:
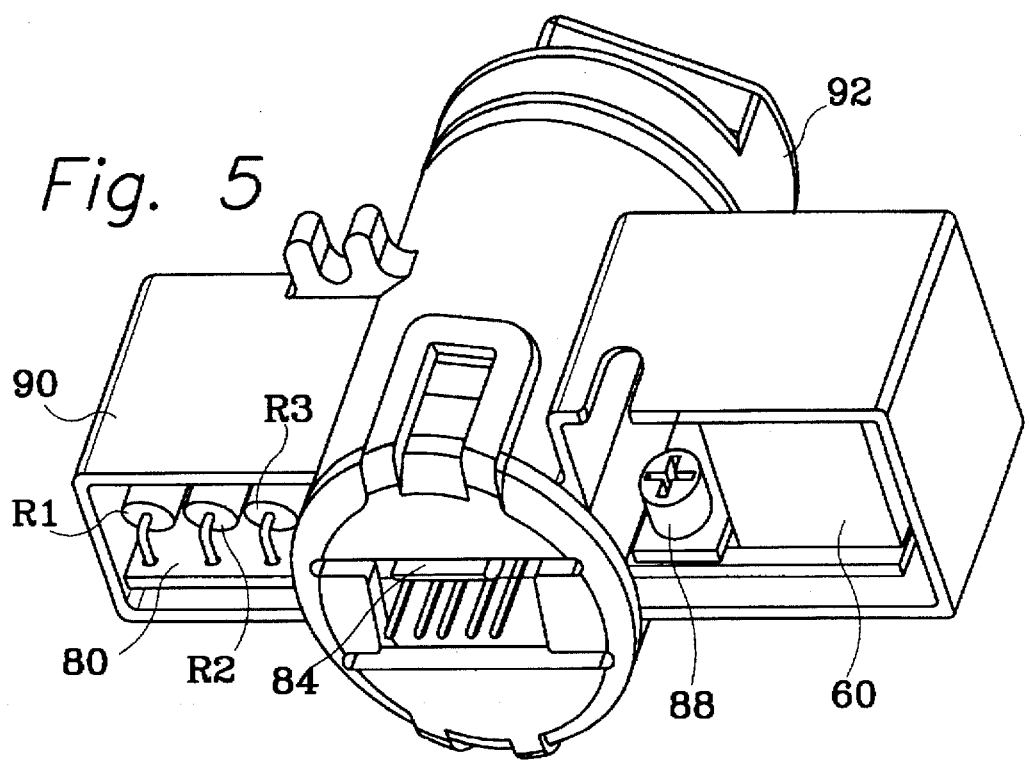
FIG. 5 is a perspective view of the circuit board of FIG. 4 disposed within a housing.
Figure 6:
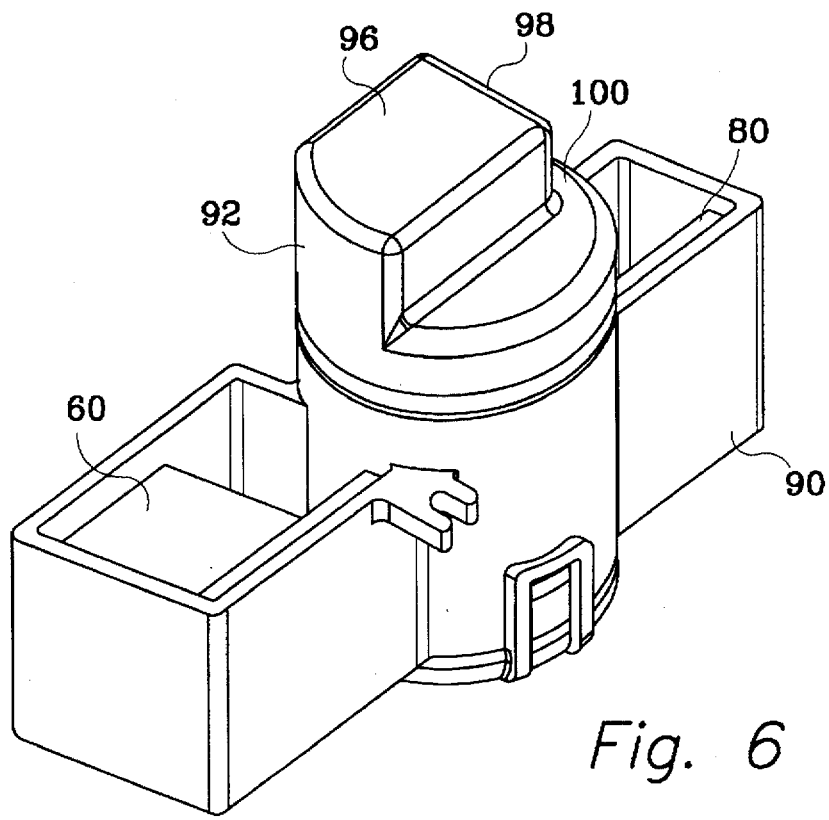
FIG. 6 is another perspective view of the housing shown in FIG. 5.

FIG. 5 is a perspective view of a housing 90 into which the circuit board 80 of FIG. 4 is disposed. A top portion 92, which will be described in greater detail below in conjunction with FIG. 6, is provided with transparent surfaces through which the emitted light E from the light emitting diode 42 can pass and through which the reflected light R can pass to be sensed by the photoresistor 44. In FIG. 5, various components on the printed circuit board 80 are identified by reference numerals to allow a comparison to be made between FIGS. 4 and 5.

In FIG. 6, the housing 90 is provided with a top portion 92. The top portion has a raised segment 96 that has a transparent face 98. In FIG. 6, the transparent face 98 is not visible, but it should be understood that it allows the emitted light E to pass through the transparent face 98 in a direction toward the right. The reflected light R can pass through a transparent surface 100 toward the photoresistor 44 described above. For purposes of reference, circuit board 80 and relay 60 are identified by reference numerals in FIG. 6 to allow comparison of FIGS. 4, 5 and 6.

Figure 7:
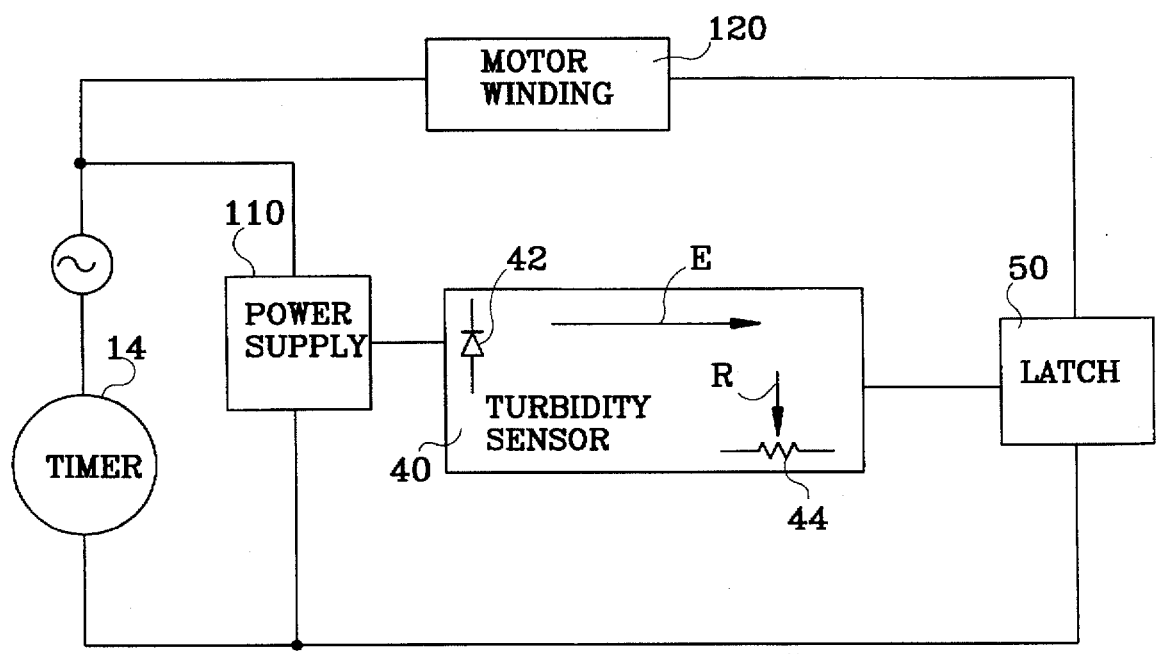
FIG. 7 is a simplified schematic of the circuit of the present invention.

FIG. 7 is a schematic representation to illustrate the basic concept of the present invention. The timer 14 contains a switch that enables the timer to connect the circuit of FIG. 7 to a source of power, such as a 110 volt 60 hertz supply. A power supply 110 is provided to reduce the voltage from 110 volts AC to an appropriate 12 volt DC voltage for use by the turbidity sensor 40. As represented schematically in FIG. 7, the light emitting diode 42 emits a light beam E which is reflected by particulate matter in a detection zone. The reflected light beam R is sensed by a photoresistor 44. A latching and delay circuit 50, which is described above in conjunction with FIG. 3, operates a relay that can inhibit a motor winding 120 from activation. When the motor winding is inhibited from operating a drain pump, water remains in the dishwasher and is not purged. This allows the dishwasher to save water by using water from a previous wash operation that is not sufficiently dirty to be discarded.

FIG. 8 shows an exemplary timing chart which describes the total operation cycle of a dishwasher. The top row in FIG. 8 represents the cumulative time. As the electromechanical timer rotates, the cam surfaces on its cams actuate and deactuate switches to cause the dishwasher to operate. It should be understood that the various drain operations, fill operations and wash operations typically require the activation and deactivation of several different switches to control the motor, the heater, and the valves to accomplish the operations represented in FIG. 8. In the timing chart of FIG.

8, the selectable start times are indicated. These start times represent mechanical detents on the timer that allow the operator to select various cycles as a function of the anticipated dirtiness of the load. For example, the operator would start the cycle at the beginning for a heavy duty cycle, would start the cycle at the fourteenth minute for a normal cycle and would start the cycle at the twenty-seventh minute for a light duty cycle. Each selectable start time begins with a drain operation to purge the bottom portion of the dishwasher of any soiled water that may have accumulated. This drain "DR" is followed by a fill operation "FILL" during which approximately eight quarts of water are caused to flow into the dishwasher. When the fill operation is complete, the wash cycle "WASH" proceeds. It should be understood that the wash cycles can also be considered to be rinse cycles if no soap is in the water. Since the present invention is not directly dependent on the presence or absence of soap in the water, this optional characteristic will not be described in detail. In the bottom row of the timing chart shown in FIG. 8, the turbidity sensor "ON" times represent the times when the electromechanical timer activates the switch 70 in FIG. 3. These activation intervals are determined by the positions of protrusions on the cam surface of a cam within the body of the timer. When the turbidity sensor is turned on, such as during minute 13, minute 26 or minute 36, the turbidity sensor determines whether the turbidity of the water is sufficiently low to inhibit the following drain operation.

To describe the advantage of the present invention, a hypothetical situation will be used. If a load of dishes has very little food matter on it, but the operator improperly selected the heavy duty cycle option by setting the electromechanical timer to minute number 1 in FIG. 8, the procedure would begin with a drain operation to purge the dishwasher of any residue at its bottom followed by a fill operation that requires the insertion of eight quarts of water into the dishwasher. The wash operation, from minute 6 to minute 13, would be completed in a normal fashion. During the thirteenth minute, the electromechanical timer would activate the turbidity sensor which would detect a very low turbidity because of the minimal amount of dirt on the dishes. The turbidity sensor would then disable the drain winding of the electrical motor 16 and the drain operation, during minutes 14 and 15, would not be performed. Since no water is drained from the dishwasher, the fill cycle would not cause any appreciable amount of water to enter the dishwasher. This would avoid the need for using eight quarts of water during minutes 16, 17 and 18. The wash cycle between minutes 19 and 26 would rewash the dishes with the existing water that remained in the dishwasher from the fill cycle during minutes 3, 4 and 5. The same procedure would be repeated during minute 26. If, for any reason, the turbidity of the water rises above a preselected threshold, the drain cycle during minutes 27 and 28 would not be inhibited. However, if the water remains relatively clear and the turbidity is low, the turbidity sensor would again inhibit the drain winding of the motor and no water would be drained from the dishwasher. As can be seen from observing the timing diaphragm of FIG. 8, the fill operations that begin at minutes 16, 29 and 39 could be eliminated for a savings of 24 quarts of water. The fill operations that begin at minutes 64 and 75 remain unaffected by the present invention because the drain operations that begin at minutes 62 and 73 are not controlled by the turbidity sensor. It should be understood that alternative embodiments of the present invention could easily implement cam surfaces in the electromechanical timer which turn the turbidity sensor on during those intervals also. The precise timing of the sensing intervals are selectable, during the design of the cams for the electromechanical timer, to virtually any interval during the entire operational cycle of the dishwasher. The present invention is able to save a considerable amount of water under many different circumstances. For example, if one person operates the dishwasher and completely cleans a load of dishes, but does not empty the dishes from the dishwasher, another party could inadvertently start the electromechanical timer without knowing that the dishes had already been cleaned. Normal dishwashers which do not include the present invention could possible run the dishwasher through the entire cycle and waste 48 quarts of water. If the present invention is included in the dishwasher structure, this potential waste would be limited to the eight quarts following the drain cycle that begins at minute one and the water that flows during the fill operations following the drain cycles that begin at minutes 62 and 73. Naturally, if a cam is used in the electromechanical timer which also turns the turbidity sensor on at those times, the total waste of water could be limited to eight quarts.

The present invention provides a significant benefit to the operation of a dishwasher and saves a huge amount of water under various circumstances. In addition, the benefits of the present invention can be achieved through the use of a relatively inexpensive turbidity sensor system. This permits the water and energy saving characteristics of the a turbidity sensor to be employed in dishwashers that are less expensive than would otherwise be possible.

Although the present invention has been described in particular detail and illustrated to show a preferred embodiment of the present invention, it should be understood that other embodiments are also within its scope.

The embodiments of the invention in which an exclusive property or right is claimed are defined as follows:

1. A machine for washing articles, comprising:
   a turbidity sensor disposed in said machine for determining a magnitude of turbidity of water within said machine;
   means for removing water from said machine, said turbidity sensor being connected in association with said removing means to permit said turbidity sensor to inhibit said removing means from removing water from said machine; and
   a timer comprising a plurality of switches, said plurality of switches being controllable by said timer in a preselected chronological sequence, one of said plurality of switches being connected in association with said turbidity sensor to activate said turbidity sensor at one or more predetermined intervals during a wash cycle of said machine, whereby said timer can activate said turbidity sensor at one or more preselected intervals during the operation of said machine and, when activated, said turbidity sensor can determine said magnitude of the turbidity of said water within said machine for washing articles and can inhibit the operation of said removing means as a function of said magnitude of turbidity.

2. The machine of claim 1, wherein:
   said removing means comprises an electric motor associated with a drain to pump said water out of said machine.

3. The machine of claim 2, wherein:
   said turbidity sensor is connected to a winding of said electric motor to prevent power from being connected to said drain winding when said magnitude of turbidity is within a preselected range of values.

4. The machine of claim 1, wherein:

said turbidity sensor is disposed within a pump housing of said machine.

5. The machine of claim 1, wherein:

said machine is a dishwashing machine.

6. The machine of claim 1, wherein:

said machine is a clothes washing machine.

7. The machine of claim 1, wherein:

said turbidity sensor comprises a light sensitive component positioned to measure light emitted by a light source and scattered by particulate matter suspended within said water.

8. The machine of claim 7, wherein:

said light sensitive component is disposed to receive light in a direction which is approximately ninety degrees from the direction in which the light is emitted by said light source.

9. The machine of claim 7, wherein:

said light source is a light emitting diode.

10. The machine of claim 9, wherein:

said light sensitive component is a photoresistor.

11. A machine for washing articles, comprising:

a turbidity sensor disposed in said machine for determining a magnitude of turbidity of water within said machine;

means for removing water from said machine, said turbidity sensor being connected in association with said removing means to permit said turbidity sensor to inhibit said removing means from removing water from said machine, said removing means comprising an electric motor associated with a drain to pump said water out of said machine; and an electromechanical timer comprising a plurality of switches, said plurality of switches being controllable by said timer in a preselected chronological sequence, one of said plurality of switches being connected in association with said turbidity sensor to activate said turbidity sensor at one or more predetermined intervals during a wash cycle of said machine, whereby said timer can activate said turbidity sensor at one or more preselected intervals during the operation of said and, when activated, said turbidity sensor can determine said magnitude of the turbidity of said water within said machine and can inhibit the operation of said removing means as a function of said magnitude of turbidity.

12. The machine of claim 11, wherein:

said turbidity sensor is connected to a winding of said electric motor to prevent power from being connected to said drain winding when said magnitude of turbidity is within a preselected range of values.

13. The machine of claim 11, wherein:

said turbidity sensor is disposed within a pump housing of said machine.

14. The machine of claim 11, wherein:

said machine for washing articles is a dishwashing machine.

15. The machine of claim 11, wherein:

said machine is a clothes washing machine.

16. The machine of claim 11, wherein:

said turbidity sensor comprises a light sensitive component positioned to measure light emitted by a light source and scattered by particulate matter suspended within said water.

17. The machine of claim 16, wherein:

said light sensitive component is disposed to receive light in a direction which is approximately ninety degrees from the direction in which the light is emitted by said light source.

18. The machine of claim 16, wherein:

said light source is a light emitting diode.

19. The machine of claim 18, wherein:

said light sensitive component is a photoresistor.

20. A machine for washing articles, comprising:

a turbidity sensor disposed in said machine for washing articles for determining a magnitude of turbidity of water within said machine;

means for removing water from said machine, said turbidity sensor being connected in association with said removing means to permit said turbidity sensor to inhibit said removing means from removing water from said machine, said removing means comprising an electric motor associated with a drain to pump said water out of said machine; and a timer comprising a plurality of switches, said plurality of switches being controllable by said timer in a preselected chronological sequence, one of said plurality of switches being connected in association with said turbidity sensor to activate said turbidity sensor at one or more predetermined intervals during a wash cycle of said machine, whereby said timer can activate said turbidity sensor at one or more preselected intervals during the operation of said machine and, when activated, said turbidity sensor can determine said magnitude of the turbidity of said water within said machine and can inhibit the operation of said removing means as a function of said magnitude of turbidity, said turbidity sensor being connected to a drain winding of said electric motor to prevent power from being connected to said drain winding when said magnitude of turbidity is within a preselected range of values, said turbidity sensor being disposed within a pump housing of said machine, said machine being a dishwashing machine, said turbidity sensor comprising a light sensitive component positioned to measure light emitted by a light source and scattered by particulate matter suspended within said water, said light sensitive component being disposed to receive light in a direction which is approximately ninety degrees from the direction in which the light is emitted by said light source, said light source being a light emitting diode, said light sensitive component being a photoresistor.

\* \* \* \* \*